Patented Sept. 20, 1932

1,878,885

UNITED STATES PATENT OFFICE

HEINRICH PAHL, OF DUSSELDORF-RATH, GERMANY

METHOD OF MANUFACTURING RUBBER HOSE

Application filed February 12, 1929, Serial No. 339,442, and in Germany February 14, 1928.

My invention relates to improvements in rubber hoses, and the method of manufacturing the same. More particularly my invention relates to the manufacture of rubber hoses reinforced by threads or strands preferably of fibrous material, and the object of the improvements is to provide a rubber hose in which the threads or strands are not subject to wear by rubbing on each other. With this object in view my invention consists in disposing the threads or strands within the body of rubber so that the adjacent threads or strands or portions thereof are out of contact with each other. In the following description reference will be made to threads or strands, but this expression is understood to include lace and similar work, wherein adjacent threads or strands thereof are spaced apart.

In carrying out the invention the threads or strands are spirally disposed within the body of rubber, the helical threads being disposed in one or more turns, the pitch of the turns depending on the number thereof. Further, the invention includes rubber tubes in which several layers are disposed one above the other. Practical experience has shown that when thus providing several layers of threads and winding the same in opposite direction the pitch should be about 63.5°, if a single turn is provided in each layer. The number of the turns of each layer is, of course, dependent on the pitch, the diameter of the tube, the thickness of the threads or strands, and the spacing of the threads. The spacing between the individual threads or the portions thereof should ordinarily be smaller than the diameter of the threads, in order that a large number of threads may be provided in each layer. But each thread or strand should be separated from the adjacent thread or strand by a wall or rib of rubber, so that the threads or strands do not rub on each other when the tube is bent or expanded in order to prolong the life of the tube.

By completely embedding the individual threads or strands in the body of rubber they are intimately bound to the rubber. In view of the large number of threads and the flat distribution thereof within the body of rubber, the thickness of the tube can be comparatively small. Further, the tubes can be manufactured by simple methods and within a short period of time so that the cost of production is materially reduced.

Figure 1:
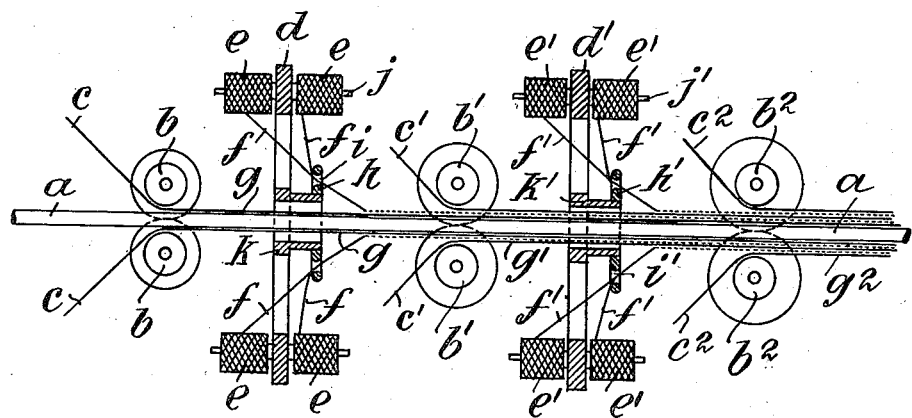
Figure 2:
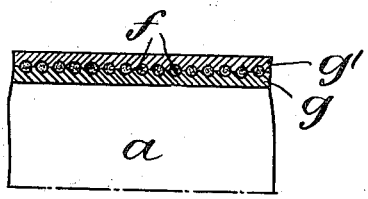
Figure 3:
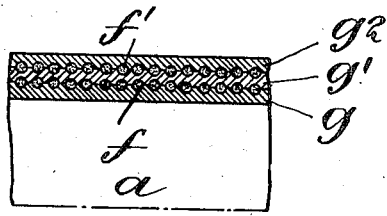

In order that the invention be clearly understood apparatus for manufacturing the rubber tube and two rubber tubes made by such apparatus have been illustrated in the accompanying drawing, in which Fig. 1 is a somewhat diagrammatic sectional elevation of the apparatus, and Figs. 2 and 3 are partial sectional views showing the tubes and the threads or strands embedded therein.

In the example shown in Fig. 1 the apparatus consists of pairs of grooved rolls $b$, $b$, $b'$, $b'$ and $b^2$, $b^2$ and a mandrel $a$ disposed between the rolls of the pairs, the said rolls being adapted to bend strips $c$, $c'$ and $c^2$ of rubber into tubular form and to combine the same at their seams by the application of pressure. Between the pairs of rollers there are rotary rings $d$, $d'$ the tubular hubs $k$, $k'$ of which carry flanges $h$, $h'$ formed with bores, $i$, $i'$. The rings $d$, $d'$ carry spindles $j$, $j'$ adapted to have spools $e$, $e'$ of threads or strands rotatably mounted thereon, the threads $f$, $f'$ being passed through the holes $i$, $i'$ of the flanges $h$, $h'$.

In the practice of the invention two strips $c$ of rubber are passed between the first pair of rollers $b$ and bent on the mandrel into tubular form, the rubber tube thus formed being passed through the tubular hub $k$ of the first ring $d$. At the rear of the said hub the threads $f$ are wound on the rubber tube thus formed by rotating the ring $d$ and the spools $e$ carried thereby. The number of the spools $e$ corresponds to the number of the turns to be applied to the inner tube $g$. In Fig. 1 the ring $d$ carries four spools $e$, but it will be understood that this number may be materially increased if desired. Suitable means are provided for braking the spools $e$, so that the threads $f$ are applied to the rubber tube under tension. Thus the threads partly press themselves into the tube $g$, as is clearly shown in Fig. 2, to fix the threads in their proper relative position during the process of manufacture.

After the first layer of threads has thus been applied to the tube $g$, the rollers $b'$, $b'$ apply thereto a second layer of rubber by forming the strips $c'$, $c'$ into a tube $g'$ and pressing the same on the threads or strands $f$ and the inner tube $g$. Thereby the projecting portions of the threads $f$ are embedded within the tube $g'$.

The tube $g$, $g'$, is now passed through the tubular hub $i'$ of the second ring, and by rotating the said ring $d'$ another layer of threads or strands $f'$ is helically wound on the tube $g$, $g'$. Preferably, the rings $d$ and $d'$ are rotated in opposite directions, so that the threads of the successive layers are wound in the opposite sense.

The tube $g$, $g'$ having the outer layer $f'$ partly embedded therein is now passed between the pairs of rollers $b^2$, where a third layer of rubber $g^2$ is applied thereto by bending the strips $c^2$ into tubular form.

It will be understood that the second and third layers of rubber are pressed on the inner layers, and the layers of rubber are of sufficient thickness, so that the projecting portions of the threads or strands are completely embedded therein.

If desired further layers of strands and rubber may be applied to the tube according to the desired thickness of the tube.

By varying the velocity of the feed of the rubber tubes or the velocity of the rotation of the rings $d$, $d'$, the pitch of the helically wound threads can be varied.

The method of manufacturing rubber tubes may also be used in the manufacture of tubes having reinforcing lace work, in which case in lieu of the rotary rings $d$, $d'$ lace making devices are provided.

By my improved method in which the superposed layers of rubber are pressed on one another in the form of strips and by rollers, the rubber is safely pressed between the lace threads, so that also in case of lace work the threads are completely and safely embedded in rubber.

In some cases I provide a plurality of pairs of rollers at the rear of each thread applying or lace making device, so that the layers of lace work are separated by a plurality of layers of rubber. In this case the layer of rubber first applied to the lace work may be comparatively thin, so that the rubber is safely pressed into the interstices between the threads. Preferably the successive pairs of rollers are angularly displaced with relation to one another, so that the seams are circumferentially displaced with relation to each other. When thus applying two layers of rubber on layers of strands, the second layer of rubber reinforces the layer which has first been applied to the threads, and it provides the foundation for the following layer of threads, the said threads being partly pressed into the rubber. By providing a plurality of pairs of rollers in succession for combining a plurality of layers of rubber into a tube, tubes of particularly thick walls can be manufactured.

I claim:

1. The herein described method of manufacturing rubber hose, which consists in forming a tube of rubber, superficially embedding therein a single fibrous layer comprising strands under tension and so that adjacent strand portions are out of contact with each other, and applying on the fibrous layer thus formed a layer of rubber.

2. The herein described method of manufacturing rubber hose, which consists in forming strips of rubber into a tube, superficially embedding therein a single fibrous layer comprising strands under tension and so that adjacent strand portions are out of contact with each other, and applying on the fibrous layer thus formed strips of rubber combined into a tube.

3. The herein described method of manufacturing rubber hose, which consists in forming a tube of rubber, superficially embedding therein a single fibrous layer comprising strands under tension and so that the strands partly project from the surface of the tube and that adjacent strand portions are out of contact with each other, and applying on the fibrous layer thus formed a layer of rubber so as to embed the projecting portions of the strands.

4. The method of manufacturing rubber hose, which consists in pressing two elongated strips of rubber longitudinally upon a mandrel so as to unite them at their margins, applying strands under tension to said strips of rubber so that said strands are partly embedded in said rubber and partly project from the surface thereof, and adjacent strand portions are out of contact with each other, and pressing thereon two further strips of rubber so as to unite them at their margins and so as to embed the projecting portions of said strands.

In testimony whereof I hereunto affix my signature.

HEINRICH PAHL.